United States Patent
Lenssen et al.

(10) Patent No.: US 6,982,699 B1
(45) Date of Patent: Jan. 3, 2006

(54) GRAPHICAL DISPLAY INPUT DEVICE WITH MAGNETIC FIELD SENSORS

(75) Inventors: Kars-Michiel H. Lenssen, Eindhoven (NL); Marc E. C. Lambrechts, Leuven (BE); Gerardus J. J. Vos, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1188 days.

(21) Appl. No.: 09/108,643

(22) Filed: Jul. 1, 1998

(30) Foreign Application Priority Data

Jul. 8, 1997  (EP) .................................. 97202104

(51) Int. Cl.
*G09G 5/00* (2006.01)
*G09G 5/08* (2006.01)

(52) U.S. Cl. ...................................... 345/157; 345/156

(58) Field of Classification Search ........ 345/156–179, 345/145, 7, 8, 420; 359/630; 338/32 R; 324/247, 207.12; 342/147, 231; 364/424.013; 600/409

See application file for complete search history.

(56) References Cited

U.S. PATENT DOCUMENTS

| | | | | |
|---|---|---|---|---|
| 5,307,072 A | * | 4/1994 | Jones, Jr. ..................... 342/147 |
| 5,394,028 A | | 2/1995 | Feddeler et al. ............ 327/544 |
| 5,394,029 A | | 2/1995 | Gay et al. .................... 327/511 |
| 5,440,326 A | | 8/1995 | Quinn ......................... 345/156 |
| 5,629,622 A | * | 5/1997 | Scampini ..................... 324/247 |
| 5,703,623 A | * | 12/1997 | Hall et al. .................. 345/168 |
| 5,729,129 A | * | 3/1998 | Acker ......................... 342/232 |
| 5,767,669 A | * | 6/1998 | Hansen et al. ......... 324/207.12 |
| 5,833,608 A | * | 11/1998 | Acker ......................... 600/409 |
| 5,883,564 A | * | 3/1999 | Partin ....................... 338/32 R |
| 5,886,257 A | * | 3/1999 | Gustafson et al. .... 364/424.013 |
| 5,991,085 A | * | 11/1999 | Rallison et al. ............. 359/630 |
| 5,999,185 A | * | 12/1999 | Kato et al. .................. 345/420 |
| 6,104,379 A | * | 8/2000 | Petrich et al. .............. 345/157 |

* cited by examiner

*Primary Examiner*—Bipin Shalwala
*Assistant Examiner*—David L. Lewis
(74) *Attorney, Agent, or Firm*—Edward W. Goodman

(57) ABSTRACT

An input device (302,316) includes a plurality of magnetic sensors (104,108,112) for measuring the components (106, 110,114) of a magnetic field (102) at the position of the input device (302). The magnetic field may be the geomagnetic field of the earth or a magnetic field generated by a local magnet (602). The data of at least two (104,108) of the sensors are used for calculating a first signal (208) for controlling the translation movement of a graphical element (204) on a display (202).

13 Claims, 3 Drawing Sheets

GRAPHICAL DISPLAY INPUT DEVICE WITH MAGNETIC FIELD SENSORS

BACKGROUND OF THE INVENTION

1. Field of the Invention

The invention relates to a method for controlling a graphical element on a display through manipulation of an input device, the method comprising:

measuring a plurality of components of a magnetic field related to an orientation of the input device, and controlling the graphical element on the basis of the plurality of components.

The invention further relates to an input device for controlling a graphical element on a display, the input device comprising:

a plurality of sensors for measuring respective components of a magnetic field related to an orientation of the input device, and a controller for controlling the graphical element on the basis of the plurality of components.

2. Description of the Related Art

Such a method and input device are described in U.S. Pat. No. 5,394,029. According to the known method, the orientation of an input device is determined by measuring the magnetic field at the position of the input device. This magnetic field may be the earth's geomagnetic field or a local magnetic field. The input device has three mutually orthogonal groups of Hall sensors, one for each direction of the magnetic field. The output of each of the groups is amplified and after analog-to-digital conversion, sent to a computer as three separate signals. Each of the three signals represents a respective component of the magnetic field and the signals represent, respectively, the pitch, the roll and the yaw of the input device. The known system controls computer graphics on a display in accordance with the pitch, roll and yaw signals from the input device.

SUMMARY OF THE INVENTION

It is an object of the invention to provide a method of the kind set forth which improves the control of the graphics on the display. This object is achieved, according to the invention, in a method that is characterized in that the control step includes calculating a first signal on the basis of at least two of the plurality of components, the first signal representing translation movement of the graphical element in a first direction on the display. In this way, the method can be applied in moving an indicator to a particular position on the display and, through that action, pointing to a particular object among a number of objects on the display. The movements of the input device control the movements of the indicator on the display. Pointing to an object may be followed by some confirmation step, selecting the particular object from among the number of objects. The indicator may be a cursor, like an arrow, for pointing to a button on a menu of buttons representing tasks or information items in an application program. The moving indicator may also be implemented as a moving highlight or other indicative measure along a row of selectable objects. Furthermore, the graphical element so controlled may be a more complex object than the indicator. It may be an animated object on the display, like a car or a plane, the translation movement of which is controlled by the translation movement of the input device. The graphical element may also be an animated character that is guided through a virtual world on the display, whereby the guidance includes the translation movement controlled by the input device.

It is known, as such, to control the position of a cursor on a display through determining the orientation of an input device. U.S. Pat. No. 5,440,326 describes an input device equipped with a gyroscope to sense changes in the orientation of the device. Through these changes, a cursor on a computer display is controlled. The gyroscope is driven by a motor requiring a relatively large amount of power. The gyroscope is complicated to manufacture and is relatively expensive. Furthermore, the input device with the gyroscope experiences an intrinsic, continuous drift, resulting in a movement of the cursor on the display while the input device is held still. The input device according to the invention is very different from the known input device of the reference in that it is based on a different principle of sensing its orientation. The orientation of the device according to the invention is determined by measuring the magnetic field around the input device. This avoids the above mentioned drawbacks: the device requires a small amount of power, is easier to manufacture and experiences no drift. Furthermore, the size of the input device according to the invention can be very small compared to the known device.

An embodiment of the method according to the invention is characterized in that the calculating step further includes calculating a second signal on the basis of at least two of the plurality of components, at least one of the at least two of the plurality of components being different from the at least two components for calculating the first signal, the second signal representing translation movement of the graphical element in a second direction on the display. By calculating a second signal for controlling the graphical element in a second direction on the display, full control of the graphical element on the display is possible.

An embodiment of the method according to the invention is characterized in that the controlling step includes an initialization step of measuring reference values of the plurality of components with respect to an orientation of the input device at an instant of executing the initialization step, and wherein the calculating step calculates the first signal on the basis of a difference between current values and the reference values of respective ones of the at least two of the plurality of components. The initialization step provides a reference orientation for the input device. Subsequent changes in the orientation of the input device are calculated with respect to this reference position. Such a reference orientation can, for example, be the orientation of the input device while the user points towards the center of the display. The actual trigger for input device while the user points towards the centre of the display. The actual trigger for executing the initialization step can be chosen from various possibilities. This could be when the device is activated, e.g., switched on or lifted from a resting place, thus immediately providing a reference position. Additionally, or alternatively, the initialization step could be executed at the request of the user, e.g., through pressing a button arranged for this purpose. Also the execution of the initialization step could be triggered by an external event, e.g., a sudden disturbance in the magnetic field.

An embodiment of the method according to the invention is characterized in that the magnetic field is generated by a permanent magnet or an electromagnet. Such a generated field can be designed to be stronger than the permanent geomagnetic field. The orientation of the input device can then be detected in a more reliable manner, which is less susceptible to disturbances.

It is a further object of the invention to provide an input device of the kind set forth which allows improved control of the graphics compared to the known input device. This object is achieved, according to the invention, in an input device which is characterized in that the controller includes calculation means for calculating a first signal on the basis of data from at least two of the plurality of sensors, the first signal representing translation movement of the graphical element in a first direction on the display. The input device according to the invention allows the control of a graphical element on the display. This can be used for pointing and selecting objects from among a plurality of objects on the display, and for controlling an animated object or character on the display. Furthermore, the input device according to the invention is less sensitive to disturbances than the known input device, because it combines data from two components of the magnetic field into one control signal. A disturbance in a first one of the components will not be fully passed on to the control signal but will be mitigated by the second one of the components.

An embodiment of the input device according to the invention is characterized in that the input device further comprises reset means for measuring reference data of the plurality of sensors with respect to the orientation of the input device, and wherein the calculating means is arranged for calculating the first signal on the basis of a difference between current data and the reference data of respective ones of the at least two of the plurality of sensors. Through the reset means, a reference orientation of the input device may be determined. The control signal for the graphical element is based on the comparison between a subsequent orientation of the input device and the reference orientation. The reset means may be activated through a dedicated reset button on the device or through a switch that is switched on when the input device is lifted from its rest position. An example is where the user of the input apparatus operates the reset button while pointing towards the center of the display, thus making that orientation the reference orientation. When the user subsequently points away from the center, the graphical element on the display will move away from the center in the same direction as the input device. Additionally, or alternatively to activating the reset means through a reset button or a switch, the reset means may be activated when a disturbance in the magnetic field is determined. In that way, the disturbance has no erroneous impact on the movement of the indicator and the input device is rendered operational again with a new reference orientation.

An embodiment of the input device according to the invention is characterized in that at least one of the plurality of sensors is an MR (magnetoresistive) sensor. An MR sensor is a sensitive and suitable sensor for measuring a small magnetic field. This is in particular advantageous if the geomagnetic field is employed in the input device.

An embodiment of the input device according to the invention is characterized in that two of the plurality of sensors comprise an MR sensor and wherein a third of the plurality of sensors comprises a Hall sensor, the three sensors being manufactured on a single substrate. An MR sensor is sensitive in the plane of the sensor. Two MR sensors can be arranged on a single, flat substrate for measuring the magnetic field in two directions in the plane of the substrate. A Hall sensor is sensitive for the magnetic field perpendicular to the plane of the sensor. The Hall sensor can be arranged on the same substrate as the two MR sensors for measuring the magnetic field in the direction perpendicular to the plane of the substrate. So each of the three sensor measures one of the three orthogonal directions of the magnetic field. In an embodiment, each of the sensors is manufactured separately and is subsequently attached to the common substrate at the desired position, e.g., as in a so-called MCM (Multi Chip Module). Later assembly of the input device only requires the single common substrate and does not require further assembly of different substrates into the input device. An alternative embodiment is where the three sensors are directly manufactured on the same common substrate, e.g., a silicon wafer. The advantages are that only a single manufacturing process is required and that the positioning and alignment of the sensors can easily be realised in that process.

BRIEF DESCRIPTION OF THE DRAWINGS

The invention and its attendant advantages will be further elucidated with the aid of exemplary embodiments and the accompanying schematic drawings, in which.

Corresponding features in the various Figures are denoted by the same reference symbols.

DESCRIPTION OF THE PREFERRED EMBODIMENTS

Figure 1:
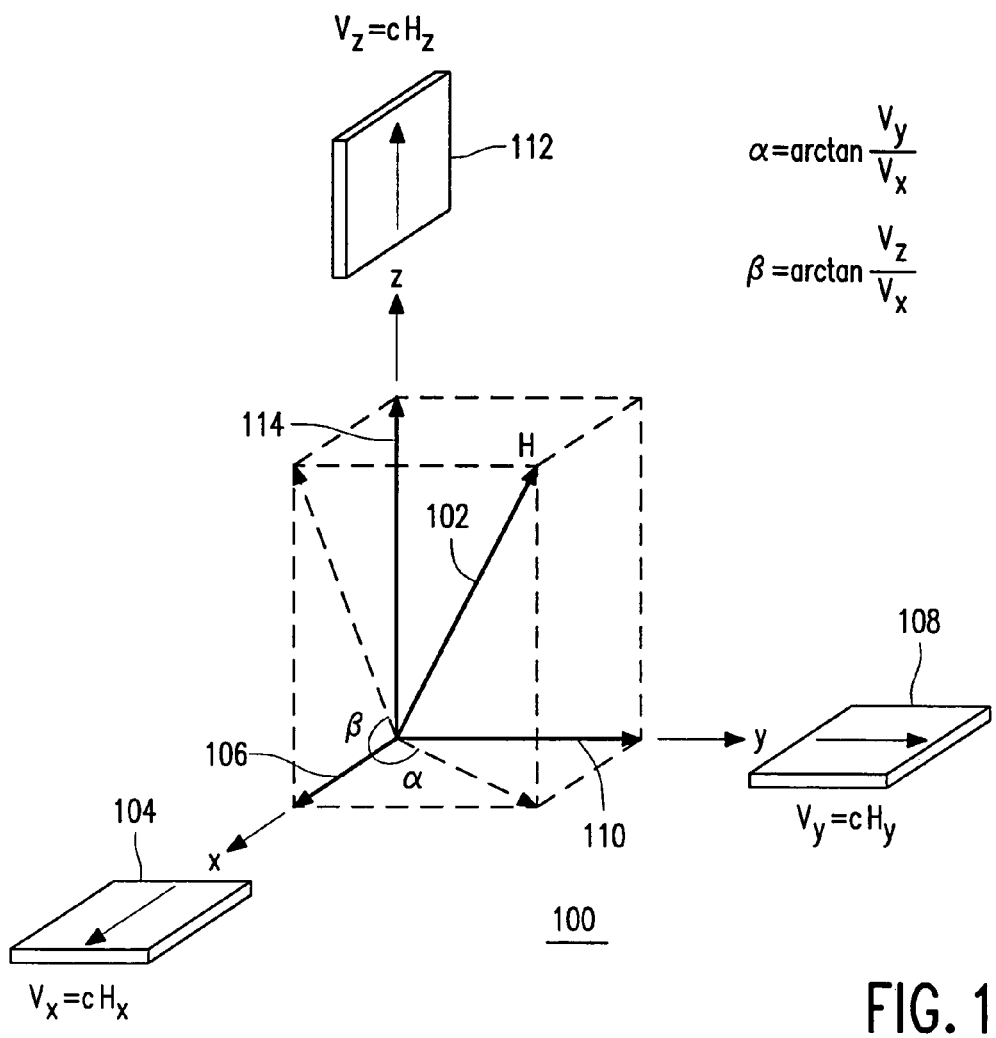
FIG. 1 schematically shows the principle of operation of the input device according to the invention.

FIG. 1 schematically shows the principle of operation of the input device according to the invention. The input device 100 is arranged to measure the three orthogonal components of magnetic field 102. This magnetic field may be the geomagnetic field of the earth or a local magnetic field, specifically generated by the input device. The input device comprises a sensor 104 for measuring the $H_x$ component 106, a sensor 108 for measuring the $H_y$ component 110 and a sensor 112 for measuring the $H_z$ component 114. The sensors in FIG. 1 are implemented as AMR (anisotropical magnetoresistive) sensors by way of example. Other types of sensors are also feasible. The sensors produce a signal that is proportional to the respective measured component of the magnetic field. The value of the output signal for a given magnetic field depends on the construction of the sensor and may be different among the three sensors. An MR sensor is sensitive to a magnetic field in a particular direction in the plane of the sensor and produces a signal that is proportional to the magnetic field in that direction. The signal $V_x$ of sensor 104 is proportional to the strength of the $H_x$ component of the magnetic field, the signal $V_y$ of sensor 108 is proportional to the strength of the $H_y$ component of the magnetic field, and the signal $V_z$ of sensor 112 is proportional to the strength of the $H_z$ component of the magnetic field. The output signals will be further processed and used to control a graphical element on the display of the system for which the input device is operative. When the orientation of the input device changes to a new position, the three sensors and the shown co-ordinate system will take a new position with respect to the magnetic field 102. In dependence on the change of orientation, the measured components will change, resulting in new output signals from which the new position can be calculated. If the magnetic field is produced by a local magnet, the orientation of the magnetic field with respect to the input device may also be changed by changing the orientation of the local magnet. This will result, in a similar way, to new output signals obtained from the sensors. So, in the case of a magnetic field that is locally generated, as opposed to the magnetic field of the earth, there is a design choice for the input device for changing the orientation of the magnetic field with respect to the sensors. The part of the input device generating the magnetic field may be stationary and the part with the sensors freely movable, or the part with the sensors may be stationary and the part generating the field freely movable.

The input device of FIG. 1 provides three sensor output signals carrying the information on the orientation of the input device with respect to the magnetic field. According to the invention, these three sensor output signals are reduced to two signals representing translation movement of a graphical element on the display. A simple way of calculating the two signals is given in the following formulae:

$$X = \sin\left(\arctan\frac{V_y}{V_x}\right) = \frac{\frac{V_y}{V_x}}{\sqrt{1 + \frac{V_y^2}{V_x^2}}} = \frac{V_y}{\sqrt{V_x^2 + V_y^2}} \quad (1)$$

$$Y = \sin\left(\arctan\frac{V_z}{V_x}\right) = \frac{\frac{V_z}{V_x}}{\sqrt{1 + \frac{V_z^2}{V_x^2}}} = \frac{V_z}{\sqrt{V_x^2 + V_z^2}} \quad (2)$$

In this embodiment, an additional sine-function has been applied for obtaining the X-signal and the Y-signal. An alternative calculation would be to omit the sine-function. Furthermore, respective scale factors may be applied in the formulae in order to obtain an appropriate scale for the translation movement of the graphical element on the display.

In an alternative embodiment, the X-signal and the Y-signal are calculated with respect to a reference orientation of the input device. To this end, the input device is reset in the desired reference orientation and the respective output signals $V_{x0}$, $V_{y0}$ and $V_{z0}$ of the sensors are determined and stored for subsequent calculations. The X-signal and the Y-signal are then obtained according to the following formulae:

$$X = \frac{V_{x0}V_y - V_{y0}V_x}{\sqrt{V_x^2 + V_y^2} \cdot \sqrt{V_{x0}^2 + V_{y0}^2}} \quad (3)$$

$$Y = \frac{V_{x0}V_z - V_{z0}V_x}{\sqrt{V_x^2 + V_z^2} \cdot \sqrt{V_{x0}^2 + V_{z0}^2}} \quad (4)$$

In cases where the overall strength of the magnetic field is substantially the same for different positions of the input device, e.g., in the case of the geomagnetic field, the formulae (3) and (4) can be reduced to:

$$X = \frac{V_{x0}V_y - V_{y0}V_x}{V_x^2 + V_y^2} \quad (5)$$

$$Y = \frac{V_{x0}V_z - V_{z0}V_x}{V_x^2 + V_z^2} \quad (6)$$

Figure 2:
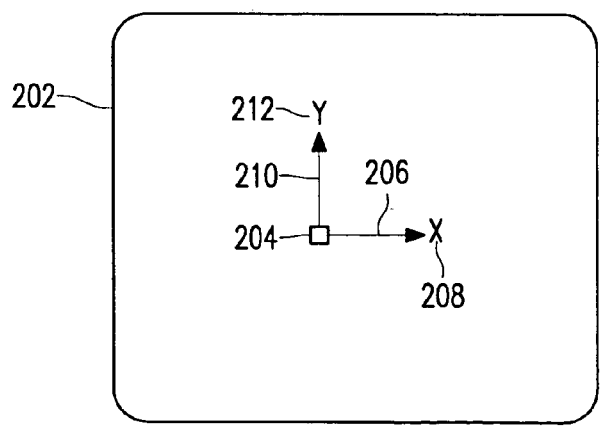
FIG. 2 shows the translation movement, according to the invention, of a graphical element on the display.

FIG. 2 shows the translation movement, according to the invention, of a graphical element on the display. On a display 202 a graphical element 204 is displayed. This graphical element may be an implemented as cursor, e.g., in the form of an arrow, cross or other symbol. However the cursor may also be implemented as some highlight moving across objects on the display, whereby the particular object is highlighted which is being pointed to. Furthermore, the graphical element may be a more complex image representing an object on the display. The graphical element 204 is moved in the horizontal direction 206 in response to the X-signal 208 and is moved in the vertical direction 210 in response to the Y-signal 212. The actual movement in a certain direction in response to the respective signal may be implemented in different ways. It is possible that the graphical element assumes a position along that direction in direct proportion to the signal. When the signal is zero, the graphical element is at its reference position, e.g., the center of the display, and when the signal has a certain value, the graphical element assumes a position corresponding to that signal valve and the graphical element remains at its latest position along the respective direction. Alternatively, when the signal has a certain value it moves with a certain speed, e.g., in proportion to the value of the signal, and does so until the signal value changes. In this implementation the input device operates similar to an accelerator pedal and the actual position of the graphical element has no correspondence to the actual signal value.

The X-signal and Y-signal generated by the input device, according to the invention, are representing respective translation movements. How these signals are exploited in an application running on the system to which the input device is connected, is determined by the specific application. The application may exploit the signal to control the translation movement of the graphical element in one of the ways described above. However, the application may also use the signal to generate a different, potentially more complex movement of the graphical element.

The input device according to the invention may have a reset function providing a new reference orientation for the movements of the graphical element. Resetting the input device may involve two separate actions. The output values corresponding to the orientation at the moment of the reset are determined and stored for subsequent measurements. These values are then used as offset values in the subsequent calculations. Furthermore, resetting the input device may move the graphical element, e.g., the cursor, to a predetermined reference position, for example, the center of the display, the upper left corner of the display, or at the first object of a row of objects on the display. In order to execute the reset function, the input device may be provided with a dedicated reset button to be operated by the user of the device. When the user holds the input device with a suitable orientation, he may operate the reset function and in that way define this suitable orientation as the reference orientation. The reset function may also be executed when the input device is activated. This can be realized as a switch which is activated when the user lifts the input device from its rest position. The reset function may also be executed automatically in case of a disturbance resulting in a relative large change in the overall strength of the magnetic field. The input device of this embodiment monitors the strength of the magnetic field and when this differs too much from the reference values, the reset function is executed again. To this end, it is determined whether one of the following conditions is fulfilled:

$$V_x^2+V_y^2+V_z^2>(1+\delta)\cdot(V_{x0}^2+V_{y0}^2+V_{z0}^2) \quad (7)$$

$$V_x^2+V_y^2+V_z^2>(1+\delta)\cdot(V_{x0}^2+V_{y0}^2+V_{z0}^2) \quad (7)$$

$$V_x^2+V_y^2+V_z^2<(1-\delta)\cdot(V_{x0}^2+V_{y0}^2+V_{z0}^2) \quad (8)$$

In these formulae, the symbol $\delta$ defines a threshold for the allowable variation in the strength of the magnetic field.

In the example in FIGS. 1 and 2, the two components of the magnetic field from which the signal for controlling the graphical element are calculated, are orthogonal components. This is not necessary for application of the invention and the two components may have a different mutual angle. It is a sufficient condition that the two components are not dependent to each other, i.e., that they do not completely extend in the same direction. The combination of two components into a single signal for controlling the translation movement of the graphical element makes the signal less dependent on disturbances in the magnetic field. An error in one the components, due to a disturbance, is not fully passed on to the signal but its effect is mitigated due the other component. This can also be seen from the various formulae for calculating the X-signal or the Y-signal, e.g., formulae (1) and (2).

Figure 3:
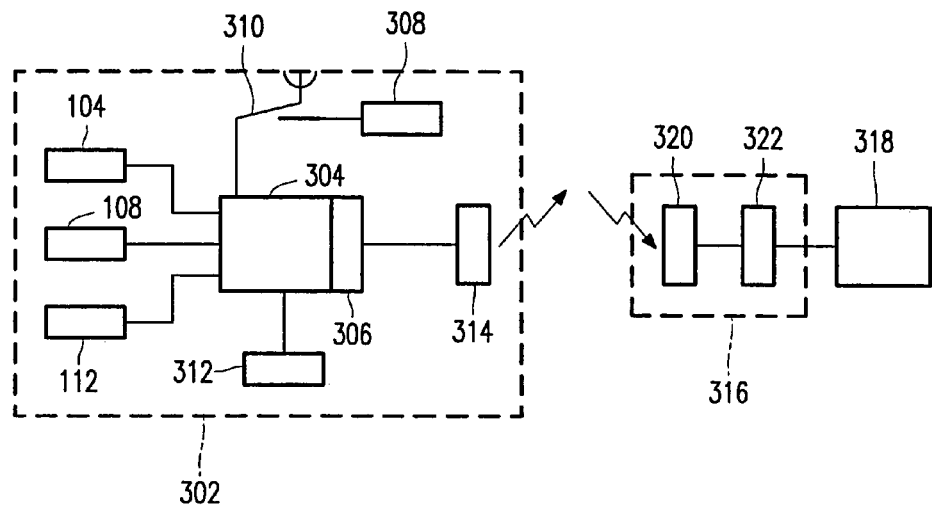
FIG. 3 schematically shows an input device according to the invention.

FIG. 3 schematically shows an input device according to the invention. A freely movable handheld part 302 comprises the sensors 104, 108 and 112 and a controller 304 controlling the graphical element on the basis of output signals of the sensors. The input device further comprises calculation means 306 for calculating the X-signal and the Y-signal and reset means 308 for resetting the input device to a reference orientation. The reset means are operated through a switch 310 which may be implemented as a user operable push button or as part of an activation switch activating the device. The device further comprises a storage 312 for storing the output signals of the sensors at the time of a reset, for later use as reference values. The calculated X-signal and Y-signal are transmitted from the handheld part through a transmitter 314 to the stationary part 316 near a display 318 on which the graphical element is to be moved. In the stationary part 316, the signals are received in a receiver 320 and are transferred to the display via interface 322. The transmitter 314 and receiver 320 may be implemented as an infrared sending/receiving device or as a radio-frequency sending/receiving device. Alternatively, the movable part 302 may be connected via a wire to the stationary thus avoiding the need for a transmitter and a receiver. However, this will limit the movements of the handheld part 302 to a certain extent. In the example shown in FIG. 3, most of the elements of the input device reside in the freely movable handheld part 302 and this part transmits the X-signal, the Y-signal and a command for moving the graphical element to the reference position.

Figure 4:
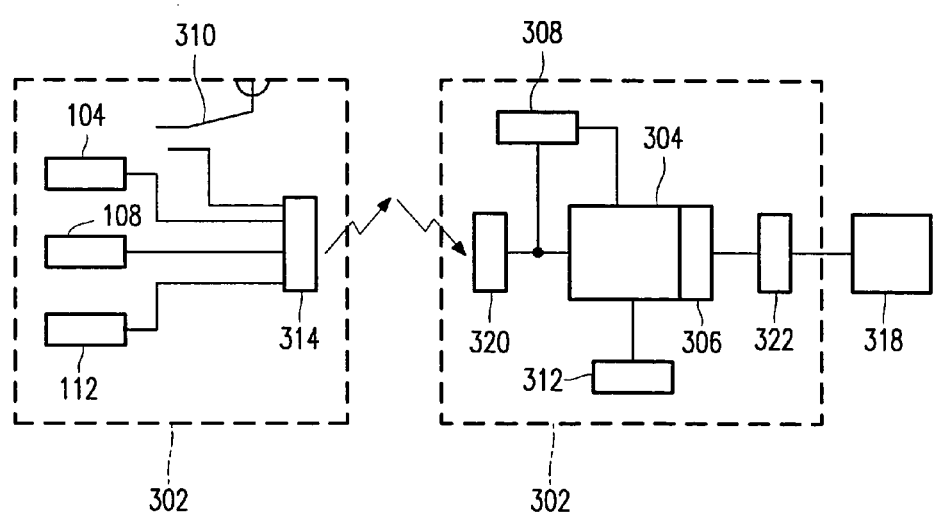
FIG. 4 schematically shows an alternative embodiment of the input device according to the invention.

FIG. 4 schematically shows an alternative embodiment of the input device according to the invention. In this embodiment, the handheld part 302 comprises the sensors 104, 108 and 112, the reset switch 310 and the transmitter 314. The other elements now reside in the stationary part 316 of the input device. The handheld part transmits the sensor output signals $V_x$, $V_y$ and $V_z$ and, if applicable, the fact that the reset switch has been activated to the stationary part.

Figure 5:
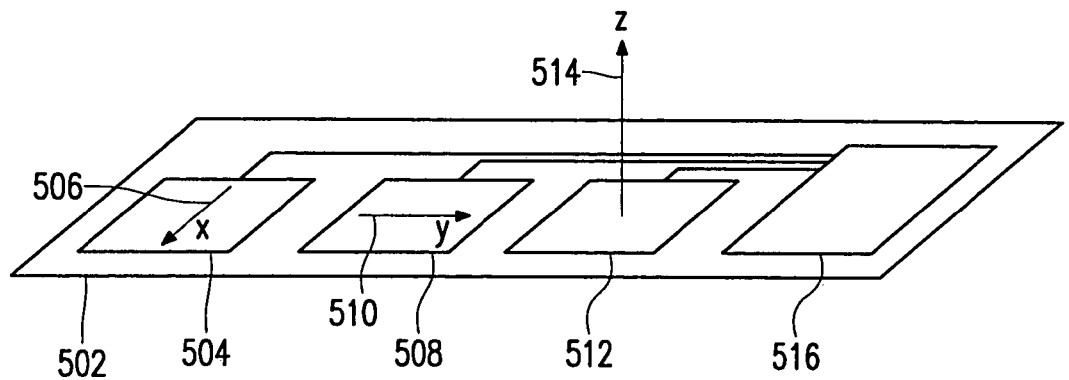
FIG. 5 schematically shows an arrangement of the sensors of the input device on a single substrate.

FIG. 5 schematically shows an arrangement of the sensors of the input device on a single substrate. The input device comprises a substrate 502, for instance of silicon, on which 3 sensors have been assembled. Sensor 504 is an MR sensor which has been made sensitive for measuring a magnetic field in direction 506 and sensor 508 is a also an MR sensor, but this one is made sensitive for measuring a field in direction 510. Sensor 512 is a Hall sensor which is sensitive in direction 514, perpendicular to the substrate. So the three sensors can each measure an orthogonal component of the magnetic field through the substrate and can therefore be used as the sensors in the input device according to the invention. It is advantageous to manufacture the three sensors on a single substrate because in this way, they can be realized in a single manufacturing step. There is no need to later assemble different substrates, each carrying one or two sensors, together for the manufacture of the input device. The substrate 502 can further comprise the sensor connection wires and additional circuitry 516, implementing the required elements like the controller 304, the calculation means 306, the reset means 308, the storage 312 and the transmitter 314. This further eases the manufacturing process of the input device and reduces the production costs.

Figure 6:
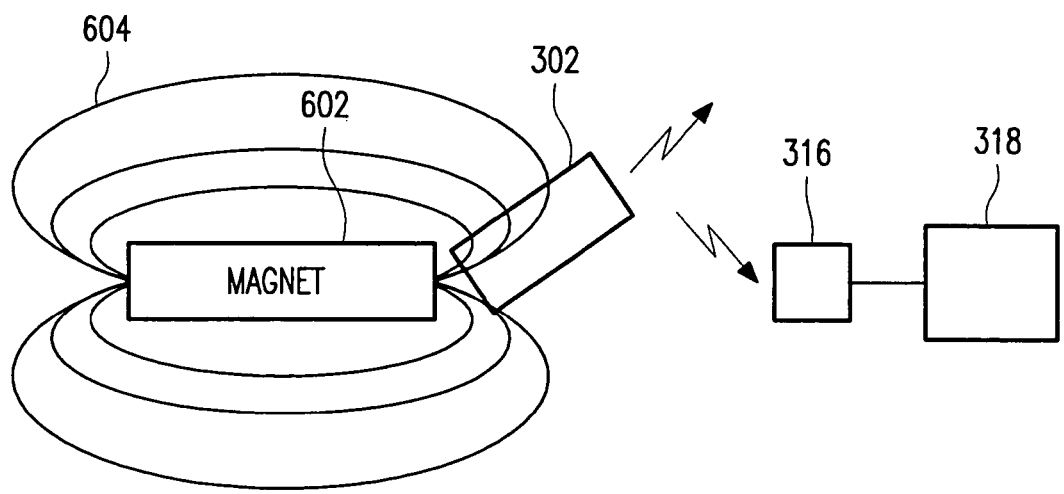
FIG. 6 shows an overview of the arrangement of the input device using a magnet for generating the magnetic field.

FIG. 6 shows an overview of the arrangement of the input device using a magnet for generating the magnetic field. A magnet 602, this may be either a permanent magnet or an electromagnet generates a magnet field 604. The movable part 302 of the input device has a certain orientation with respect to the magnetic field, resulting in specific values measured by the three sensors. The movable part 302 transmits its signals to the stationary part 316 which delivers the control signal to display 318 for moving the indicator. In an embodiment of the input device according to the invention, the magnet is realized as a bracelet on the wrist of the user, and the movable part 302 as a ring on a finger of the corresponding hand. The graphical element on the display is controlled by simple movements of that finger because the orientation of the movable part 302 then changes with respect to the magnetic field in correspondence with the movements. The function of the bracelet and the ring could simply be interchanged, resulting in the arrangement in which the ring includes a magnet and the bracelet includes the sensor sensing changes of the magnet field. Also in this arrangement, the graphical element is controlled through movements of the finger with ring relative to the wrist with the bracelet.

In an alternative embodiment, the magnet 602 is arranged in the stationary part 316, thus forming a single stationary part of the input device. In this embodiment, the input device according to the invention still comprises only two part despite the fact that a magnet is used for generating the magnetic field.

The invention claimed is:
1. A method for controlling a graphical element on a display through manipulation of an input device, the method comprising:
   measuring a plurality of components of a magnetic field related to an orientation of the input device, said plurality of components not being dependent to each other; and
   controlling the graphical element on the basis of the plurality of components,
characterized in that the controlling step includes the substeps:

calculating a first signal X on the basis of at least two of the plurality of components, the first signal representing a translation movement of the graphical element in a first direction on the display; and calculating a second signal Y on the basis of at least two of the plurality of components, at least one of the at least two of the plurality of components being different from the at least two components used for calculating the first signal, the second signal representing a translation movement of the graphical element in a second direction on the display.

2. The method as claimed in claim 1, wherein the controlling step includes an initialization step for measuring reference values of the plurality of components with respect to an orientation of the input device at an instant of executing the initialization step, and wherein the calculating substeps calculate the first and second signals on the basis of a difference between current values and the reference values of respective ones of the at least two of the plurality of components.

3. The method as claimed in claim 2, wherein in said initialization step the measuring step measures three components of the magnetic field resulting in a measurement of the strength of the magnetic field, and wherein the initialization step is executed if the difference in strength of the magnetic field, between two successive executions of the measuring step, is larger than a predetermined threshold.

4. The method as claimed in claim 1, wherein the magnetic field is generated by a permanent magnet or an electromagnet.

5. An input device for controlling a graphical element on a display, the input device comprising:

a plurality of sensors for measuring a respective plurality of components of a magnetic field related to an orientation of the input device, said plurality of components not being dependent to each other; and a controller for controlling the graphical element on the basis of the plurality of components, characterized in that the controller comprises:

first calculation means for calculating a first signal X on the basis of data from at least two of the plurality of sensors, the first signal representing a translation movement of the graphical element in a first direction on the display; and second calculation means for calculating a second signal Y on the basis of data from at least two of the plurality of sensors, at least one of the at least two of the plurality of sensors being different from the at least two sensors used in calculating the first signal, the second signal representing a translation movement of the graphical element in a second direction on the display.

6. The input device as claimed in claim 5, wherein said input device further comprises reset means for measuring reference data of the plurality of sensors with respect to an orientation of the input device, and wherein the first and second calculation means calculate the first and second signals on the basis of a difference between current data and the reference data of respective ones of the at least two of the plurality of sensors.

7. The input device as claimed in claim 5, wherein at least one of the plurality of sensors is an MR (magnetoresistive) sensor.

8. The input device as claimed in claim 5, wherein two of the plurality of sensors comprise an MR sensor, and wherein a third of the plurality of sensors comprises a Hall sensor, the three sensors being manufactured on a single substrate.

9. The method as claimed in claim 1, wherein said steps of calculating the first and second signals use the formulas:

$$X = \frac{V_{x0}V_y - V_{y0}V_x}{\sqrt{V_x^2 + V_y^2} \cdot \sqrt{V_{x0}^2 + V_{y0}^2}} \text{ and } Y = \frac{V_{x0}V_z - V_{z0}V_x}{\sqrt{V_x^2 + V_z^2} \cdot \sqrt{V_{x0}^2 + V_{z0}^2}},$$

where $V_{x0}$, $V_{y0}$ and $V_{z0}$ are the measured components of the magnetic field.

10. The method as claimed in claim 9, wherein the controlling step includes an initialization step for measuring reference values of the plurality of components with respect to an orientation of the input device at an instant of executing the initialization step, and wherein the calculating substeps calculate the first and second signals on the basis of a difference between current values and the reference values of respective ones of the at least two of the plurality of components, and wherein said steps of calculating the first and second signals use the formulas:

$$X = \frac{V_{x0}V_y - V_{y0}V_x}{\sqrt{V_x^2 + V_y^2} \cdot \sqrt{V_{x0}^2 + V_{y0}^2}} \text{ and } Y = \frac{V_{x0}V_z - V_{z0}V_x}{\sqrt{V_x^2 + V_z^2} \cdot \sqrt{V_{x0}^2 + V_{z0}^2}},$$

where $V_{x0}$, $V_{y0}$ and $V_{z0}$ are the measured reference data.

11. The method as claimed in claim 10, wherein in said initialization step, the measuring step measures three components of the magnetic field resulting in a measurement of the strength of the magnetic field, and wherein the initialization step is executed if the difference in strength of the magnetic field, between two successive executions of the measuring step, is larger than a predetermined threshold.

12. The input device as claimed in claim 5, wherein said first and second calculation means use the formulas:

$$X = \left(\frac{V_y}{\sqrt{V_x^2 + V_y^2}}\right) \text{ and } Y = \left(\frac{V_z}{\sqrt{V_x^2 + V_z^2}}\right),$$

where $V_x$, $V_y$ and $V_z$ are the measured components of the magnetic field.

13. The input device as claimed in claim 12, wherein said input device further comprises reset means for measuring reference data of the plurality of sensors with respect to an orientation of the input device, and wherein the first and second calculation means calculate the first and second signals on the basis of a difference between current data and the reference data of respective ones of the at least two of the plurality of sensors, and wherein the first and second calculation means use the formulas:

$$X = \frac{V_{x0}V_y - V_{y0}V_x}{\sqrt{V_x^2 + V_y^2} \cdot \sqrt{V_{x0}^2 + V_{y0}^2}} \text{ and } Y = \frac{V_{x0}V_z - V_{z0}V_x}{\sqrt{V_x^2 + V_z^2} \cdot \sqrt{V_{x0}^2 + V_{z0}^2}},$$

where $V_{x0}$, $V_{y0}$ and $V_{z0}$ are the measured reference data.

* * * * *